United States Patent [19]

Büchler

[11] Patent Number: 4,838,533

[45] Date of Patent: Jun. 13, 1989

[54] DEVICE FOR REPRODUCIBLE, HIGH-PRECISION DETERMINATION OF THE RELATIVE POSITION OF A FIRST OBJECT IN RELATION TO SECOND OBJECTS

[75] Inventor: René Büchler, Oberbüren, Switzerland

[73] Assignee: Buchler B-Set AG, Flawil, Switzerland

[21] Appl. No.: 22,650

[22] Filed: Mar. 6, 1987

[30] Foreign Application Priority Data

Oct. 10, 1986 [CH] Switzerland .................. 04043/86

[51] Int. Cl.⁴ ............................................. B23Q 1/06
[52] U.S. Cl. ................................................. 269/310
[58] Field of Search ............ 269/309, 310, 254 R, 269/902, 285, 296; 33/180 R; 403/13, 14, 356; 198/345; 29/464

[56] References Cited

U.S. PATENT DOCUMENTS

| | | | |
|---|---|---|---|
| 3,123,352 | 3/1964 | Mendola | 269/254 |
| 3,729,810 | 5/1973 | Piechocki | 269/310 |
| 4,390,172 | 6/1983 | Gotman | 269/309 |
| 4,545,570 | 10/1985 | Kajell | 269/902 |
| 4,586,702 | 5/1986 | Chambers | 269/310 |
| 4,610,020 | 9/1986 | La Fiandra | 269/309 |
| 4,699,364 | 10/1987 | Birjukov et al. | 269/309 |
| 4,735,671 | 4/1988 | Stoffel et al. | 269/310 |

Primary Examiner—Robert C. Watson
Attorney, Agent, or Firm—Helfgott & Karas

[57] ABSTRACT

Figure 1:
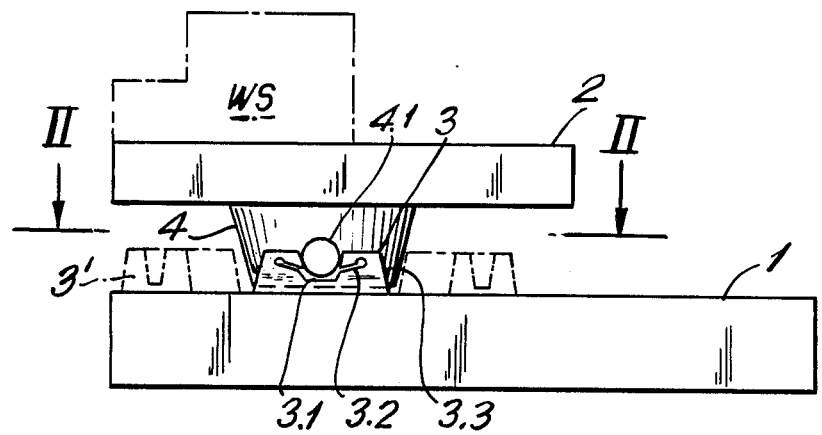
Figure 2:
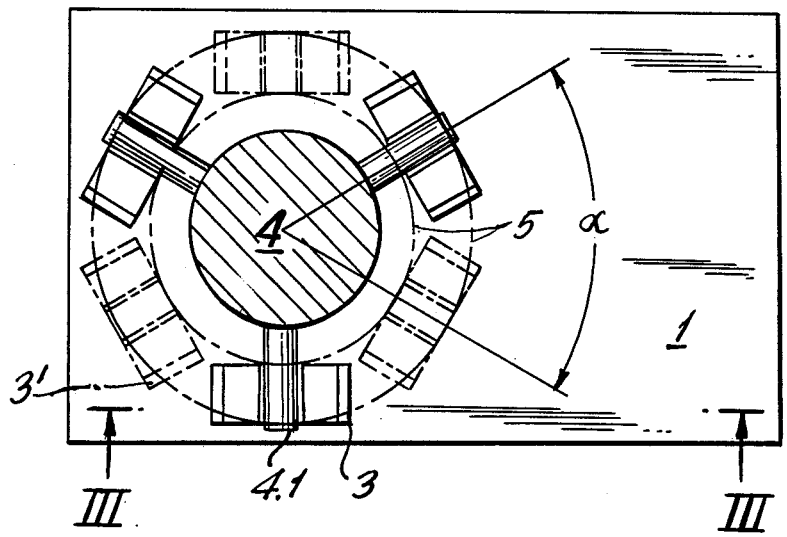

The device for reproducible coupling of two objects, specifically of a workpiece (WS) or a tool with a machine tool, attaches the workpiece (WS) or the tool for precise positioning to one of two coupling parts (1,2) in a position precisely defined in reference to a reference system of all machine tools through which the workpiece must travel. The attachment surface of one coupling P(2) has rigid profile pieces (4,1). These can be engaged with the attachment surface of the other coupling part (1) without relative motion of the two coupling parts (1,2), with the help of an appropriate number of suitable and at least partly elastically deformable transfer elements (3,3') for power transmission. The elastically deformable transfer elements (3,3') are integral parts of the latter coupling part (1) (FIGS. 1 and 2).

21 Claims, 4 Drawing Sheets

DEVICE FOR REPRODUCIBLE, HIGH-PRECISION DETERMINATION OF THE RELATIVE POSITION OF A FIRST OBJECT IN RELATION TO SECOND OBJECTS

Description

The invention refers to a device according to the general concept of claim 1. Such a device is known from EP-A2-No. 0 180 866. It serves for securing a workpiece during a machining process consisting of several consecutive machining operations. According to this prior art method, the workpiece is attached to a mounting plate having profiled cutouts on the bottom side. The machine bed has similar cutouts. When connected, a bearer bolt is located in the hollow space formed between the machine bed and the mounting plate, which, due to the conical shape of the groove side walls, assures accurate positioning between mounting plate and machine bed. For a statically determined position, only two mutually corresponding pairs of grooves (on the machine bed and on the mounting plate) should be conical, while all other grooves should have such a cross section, as to make length adjustment in the plane of the mounting plate possible. Only a single linear contact is required between one of the two parts (machine bed or mounting plate) and the bearer bolts, while there are always two linear contacts per groove for conical grooves.

Thus for the mounting plate to always assume the precise position desired on several machine tools through which the parts must travel, both the grooves in the machine bed and in the mounting plate, and the bearer bolts must be manufactured and positioned with extreme precision. This makes the device, especially the mounting plates, labor-consuming and thus expensive. Over a certain period the positioning accuracy diminishes, since the grooves and bearer bolts become worn and deformed due to the repeated exposure to stress acting over a relatively small surface (theoretically linear contact), especially through the impact when the mounting plate is set up and through friction during the mounting plate's movement.

To reduce wear, EP-A2-No. 0 180 866 proposes to provide each bearer bolt with an elastic part, whose cross section is greater than that of the bearer bolt. When the mounting plate is set up, contact first occurs between the elastic part of the bearer element and the mounting plate grooves, which moderates the impact and friction forces. When secured in its final position, the elastic part is deformed to the point that only the inelastic bearer bolts are again in snug contact with the respective groove surfaces. Thus the tension forces and the forces arising during machining can deform the bearer bolts and/or the walls as previously. This wear affects mainly precision in the perpendicular directions (Z axis) to the objects to be attached.

The objective of the present invention is, therefore, to design the aforementioned device so that the precision of attachment to one or a multiplicity of machines through which the mounting plate will successively travel will meets the required high standard of accuracy even after the attachment procedure is repeated many times.

This objective is met in the device of the invention by the characteristics provided in the wherein clause of claim 1. Advantageous embodiments and variants of the invention are described in the subclaims.

The basic idea of the invention is that the final relative position of the tool bench and the mounting plate is achieved under the effect of elastic forces. In this case it is perfectly sufficient to manufacture only one of the parts to be attached to each other, preferably the machine side part, with high accuracy. The mounting plate side part can then be made with greater manufacturing tolerances, the higher precision of the more accurate part being ultimately decisive for the final attached position of the workpiece.

Thus the surprising advantage of high accuracy positioning of the workpiece in spite of a relatively imprecise/inaccurate coupling part is achieved. The more precise part is preferably on the mounting plate, so that mounting plates produced in a rather simple, and therefore very cost-effective, manner and normally needed in great numbers can be used, still obtaining extremely high accuracy (of the order of $\mu$m). Defects and manufacturing tolerances are compensated for by elastic deformation.

To better elucidate the invention, it should be pointed out that the workpiece is usually attached to the mounting plate at a setup station outside the machine. A high-precision attachment half is normally used at the setup station for attaching the mounting plate. Thus the workpiece is attached to the mounting plate in the reference system of the high-precision coupling part. If the position of the workpiece against the high-precision coupling part is defined with high accuracy, the relative position of the mounting plate located between the two parts may be of an arbitrarily low precision, if only this "imprecise" position is assumed in a reproducible manner on the individual machines through which the part must travel. More precisely, this is assured by the presence of high-precision coupling parts, corresponding to those of the setup station, on each individual machine, so that the mounting plate assumes the same relative position on the machine as it did at the setup station.

Surprisingly, some wear without certain, relatively ample, limits of the individual coupling parts does not affect the positioning accuracy, since the positioning of the coupling part in relation to the attachment plane is assured by the fact that, on the one hand, any possible wear affects all coupling parts equally and, on the other hand, the possible errors that arise are mutually compensated for and/or eliminated. For example, if wear causes one coupling part to shift in one direction, this causes the asymmetrically opposite part to wear and to shift in the opposite direction.

In one variant of the invention the possibility of a revolver drum-type sequencing (socalled indexing) of the workpiece or tool is provided for machining the workpiece from various sides and/or with different tools. Also in the case of such "indexing" the attachment accuracy in relation to the reference system remains fully preserved.

Figure 3:
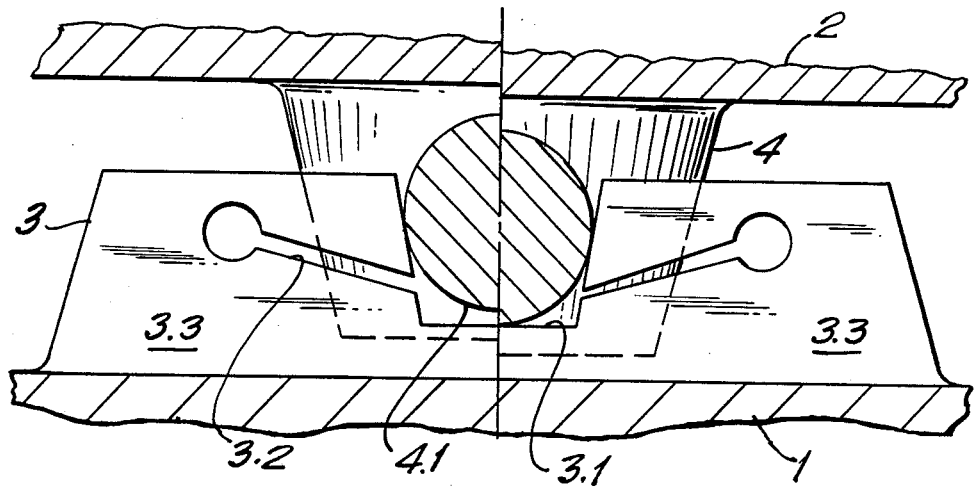

In the following the invention is explained in detail with the help of an example of embodiment and with reference to the drawing. The drawing shows:

FIG. 1 Front view of a first example of embodiment of the device according to the invention;

FIG. 2 Section along line II—II of FIG. 1;

FIG. 3 Section along line III—III of FIG. 2 for illustrating a pair of coupling devices working together with a pillow block type, elastically deformable coupling element and respective profile part in the form of a bolt on an enlarged scale.

Figure 4:
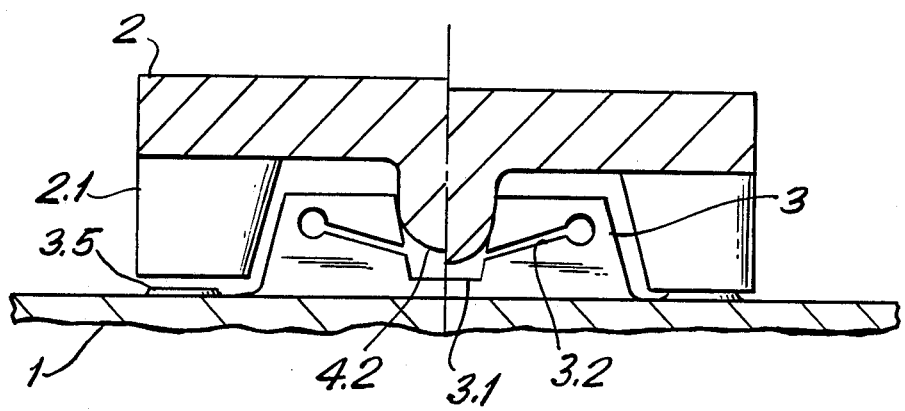
Figure 5:
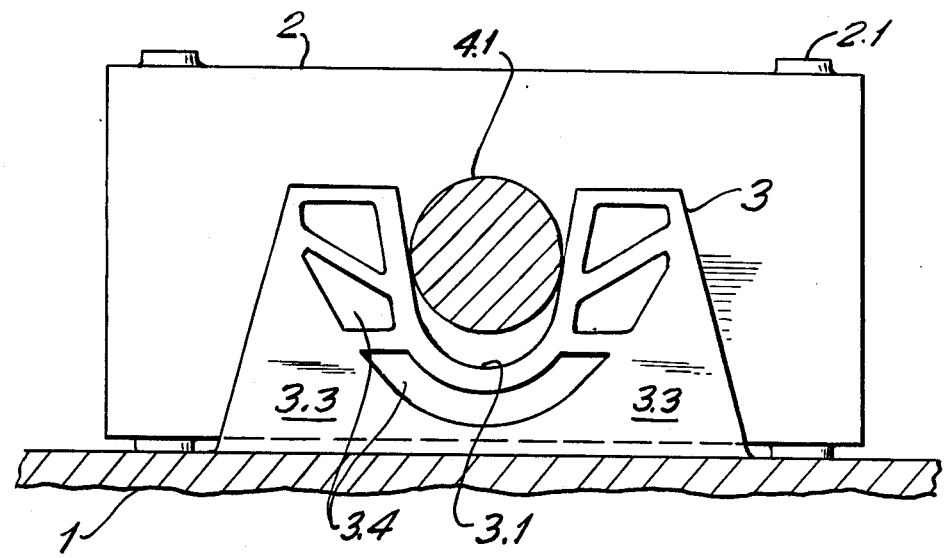
Figure 6:
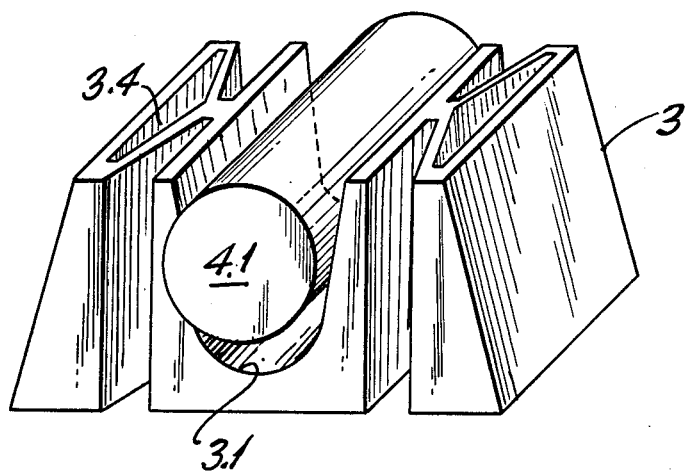
Figure 7:
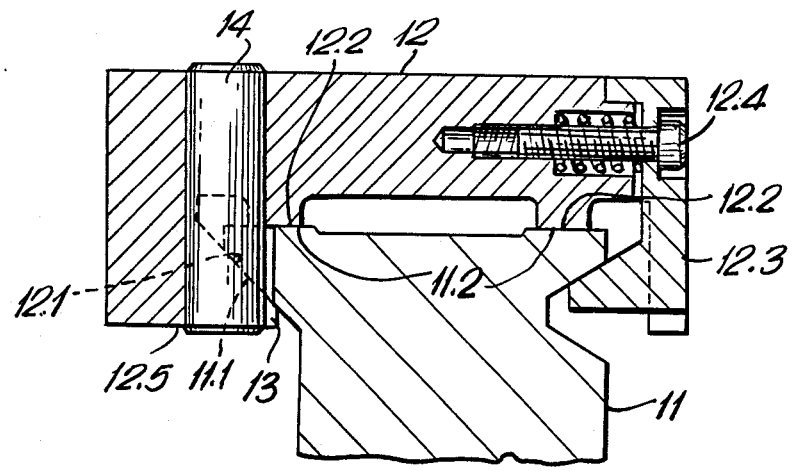
Figure 8:
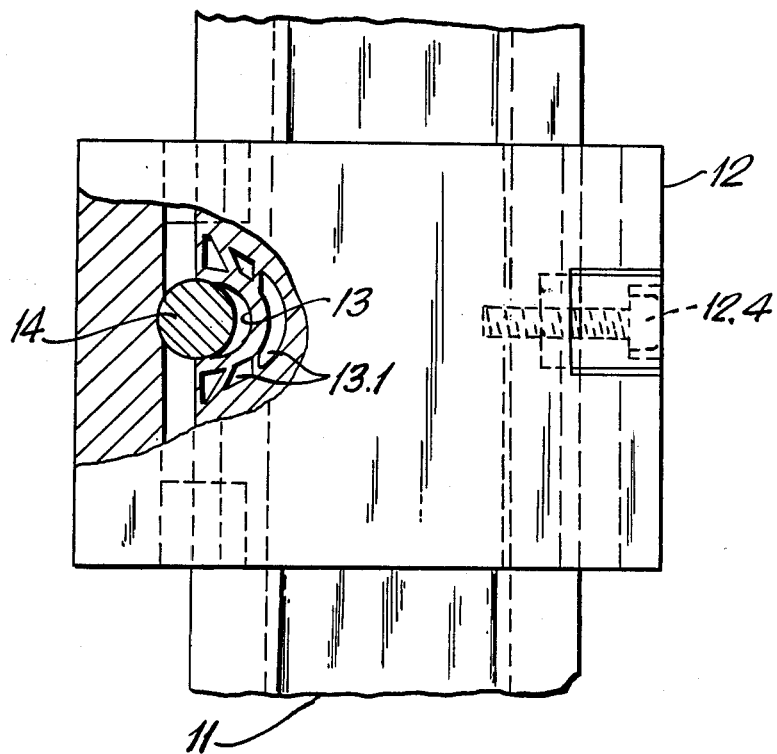

FIG. 4 An illustration similar to FIG. 3, however, with a different embodiment of the profile part in the form of a rounded rib or a ball, additionally illustrating the stop and counterstop surfaces for determining the vertical positions (Z axis);

FIG. 5 A third example of embodiment with another variant of the coupling device, in which the elastic coupling device is made with hollow spaces symmetrically arranged in the pillow block halves, illustrated in a section plane similar to Section III-III of FIG. 2;

FIG. 6 A fourth example of embodiment of the coupling devices in a perspective drawing;

FIG. 7 A front view of the device in a somewhat changed form for machine tools in cross section as a further example of the use of couplings according to FIG. 5, and FIG. 8 A partly sectioned top view of the coupling of FIG. 7.

The device for reproducibly attaching a workpiece or a tool to a machine tool according to FIG. 1 and 2 consists of a Coupling Part 1 (second object) illustrated in its bottom position, attached to the machine tool and of a coupling part sectioned in its top position, the latter serving as Bearer 2 or handling support for a workpiece WS (first object) or a tool. Both coupling parts 1, 2 have surfaces (attachment surfaces) facing each other and provided with mutually engaging attachment devices. On Coupling Part 1 corresponding to the machine tool these have the form of elastically deformable, pillow block type coupling devices or elements 3, and on Bearer 2 as rigid profile parts 4.1. Coupling Elements 3 can have individual baseplates of any shape (not shown in the drawing) and can be mounted on the periphery of a Ring Segment 5 or of a multiplicity of concentric ring segments on the attachment surface of Coupling Part 1 corresponding to the machine tool. However, they can also form a single part with said Coupling Part 1. Coupling Part 1 can be a carriage or the bench of the machine.

FIGS. 1 and 2 show two sets of three elastically deformable Coupling Elements 3 and 3' distributed on the periphery of Ring Segment 5. Each Coupling Element 3' of the second set is shifted in relation to Elements 3 of the first set by the same angle α.

In certain cases it may prove advantageous, for example, when Coupling Elements 3, 3' for determining several angular positions of Bearer 2 are distributed on the periphery of a multiplicity of concentric Ring Segments 5.

As shown in FIGS. 1 through 6, a groove is cut into each of the the pillow block type, elastically deformable Coupling Elements 3, 3'. A Profile Piece 4.1 or 4.2 of Bearer 2 works with each groove 3.1 engaging into it, these profile pieces being in the form of Bolts 4.1 in the the embodiment of FIGS. 1 through 3, as well as 5 and 6, and in the form of Rounded Ribs 4.2 on the coupling surface of Bearer 2 in the embodiment of FIG. 4. Instead of Rounded Ribs 4.2, spherical profile pieces could also be used.

While in this embodiment of the invention, rigid Profile Pieces 4.1, 4.2 of Bearer 2 and the pillow block type, elastically deformable Coupling Elements 3, 3' correspond to Coupling Part 1 of the machine tool, said attachment devices can also be arranged inversely. Also the number of Attachment Devices 3, 3', 4.1, 4.2, working together, can be the same or different on the two Coupling Parts 1, 2.

Grooves 3.1 of Coupling Elements 3, 3' have preferably a trapezoidal cross section. However, they may have another cross section shape, for example, with oblique side wall surfaces and cylindrical bottom surface (see FIG. 5 and 6) or triangular cross section.

Considering that high precision machining of Workpiece WS should be assured in a succession of machining operations on different machine tools, Workpiece WS or the tool required for machining must be placed in a position precisely defined in a reference system (three-dimensional with six degrees of freedom, e.g., three Cartesian axes and three orientation angles), identical in reference to the machine tool and to the setup station. This position is then achieved by attaching the bearer to each machine tool, according to the invention, by overcoming an elastic resistance. The elastic resistance to be overcome is, according to the concept of the invention and contrary to the prior art attachment device, installed in the pillow block type Transfer Elements 3, 3', which are integral parts of one of the two Coupling Parts 1, 2. In addition, a slot-like, axially parallel cutout 3.2 can be made on both sides of Groove 3.1 in one of each elastically deformable, pillow block type Coupling Element 3, 3' (see FIG. 1, 3, 4). Cutout 3.2 runs near the groove bottom from the side wall of each Groove 3.1 extending obliquely upwards against the cover surface of the respective pillow block half 3.3. Cutout 3.2 should have at least a width b so that when Transfer Elements 3, 3' are elastically deformed under the coupling force, and when rigid Profile Pieces 4.1, 4.2 of Bearer 2 simultaneously contact the bottom and the side surfaces of Grooves 3.1, they do not contact the side surfaces of Cutout 3.2 (see righthand side of FIGS. 3 and 4). Each Pillow Block Half 3.3 can be more or less elastically deformed under the effect of a force directed normally to the coupling surface of Coupling Part 1 of the machine tool, independently from the other Pillow Block Half 3.3. This makes it possible to compensate the manufacturing tolerances regarding form and position of rigid Profile Part 4.1, 4.2.

Elastic deformability of the groove walls can also be achieved through symmetrical hollow spaces 3.4 in Pillow Block Halves 3.3, which, however, contrary to the slot-like Cutouts 3.2 do not communicate with Grooves 3.1. Hollow Spaces 3.4 can be parallel to Grooves 3.1 (see FIG. 5) or perpendicular to their longitudinal direction (see FIG. 6). In the first case, Hollow Spaces 3.4 can be subdivided with the help of separating walls parallel to the groove.

The elastically deformable Coupling Elements 3, 3' described above are rigid against lateral forces directed approximately parallel to the plane of Section II—II in FIG. 1. Midpositioning of the bolt in the plane of Section II—II can be compensated for by the oblique lateral surfaces and by the radial shortening of the "elastic arm" in the case of elastic deformation around an imaginary elastic center of rotation.

It is also possible to provide Stop 3.5 to create a stop in the normal spatial direction to the attachment surface of Coupling Part 1 of the machine tool on said surface of each of the elastically deformable, pillow block type Transfer Elements 3, 3', as shown in FIGS. 4 and 5. The bottom surface of Grooves 3.1, not touched by Handling Base 2 of Profile Part 4.1, 4.2 introduced into the groove can be simply cylindrical. In this type of attachment Handling Base 2 also has Counterstops 2.1 working with Stop Surfaces 3.5. this embodiment has the additional advantage that any dirt (such as metal chips) getting into the space between the profile part and groove bottom can accumulate without affecting the positioning accuracy.

In FIG. 5 Bearer 2 is designed so that a Workpiece WS or a tool can be attached either to its Top 2.2 or Bottom 2.3. Therefore Counterstops 2.1 are also provided on said surfaces. In this variant Bolts 4.1 are arranged basically on the periphery of the horizontal middle plane of Bearer 2.

The principle of operation of the coupling is elucidated with the help of FIGS. 1 through 6 as follows:

After precisely positioning a Workpiece WS on Bearer 2 in reference to the reference system of all machine tools through which the workpiece must travel, Bearer 2 is mounted on Coupling Part 1 of the individual machine tool during the machining process, so that its rigid profile part 4.1, 4.2 is inserted into Grooves 3.1 of the elastically deformable, pillow block type Coupling Elements 3 or 3'. This insertion continues under the effect of well-known mounting devices until contact is made with the stop of the elastically deformable groove walls. During the insertion motion until the stop in the direction of the Z axis is reached, centering in the X and Y directions is also effected. Said stops are located in both main directions (X, Y) of a plane, which passes approxiamtely through the axes of all Bolts 4.1 or Rounded Ribs 4.2, parallel to the coupling surface of Coupling Part 1 of the machine tool and can be considered an attaching surface, and are formed by the lateral surfaces of Grooves 3.1 in the elastically deformable Coupling Elements 3, 3' of said Coupling Part 1. Due to a limited elastic deformability of the groove walls - by a fraction of a millimeter - irregularities of Bolts 4.1 caused by the production process in both directions (X, Y) of the attachment plane are compensated, so that precise positioning of Workpiece WS in relation to said axes (X, Y) is assured. For this to occur, the attachment surfaces of Coupling Part 1 of the machine tool must have at least three elastically deformable Transfer Elements 3.

The third stop in the main spatial direction normal to the plane of attachment (Z) can be given either on the flat groove bottom surface (see FIG. 3) or in the form of external stop surfaces 3.5 on either side of each pillow block type elastically deformable Coupling Element 3, 3' (see FIGS. 4 and 5).

Considering the above facts, with the attachment device of the invention only one of the two Coupling Parts 1, 2 must be precision machined, preferably the elastically deformable Coupling Element 3, 3'.

The invention makes it possible to attach a Workpiece WS or a tool to each of the machine tools through which the workpiece must travel for performing high-precision machining operations, simply and quickly, and always in the same position.

Also a revolver drum-type sequencing of Bearer 2 and Workpiece WS or tool can be performed on a machine tool through manual intervention or with the help of an industrial robot, (see FIG. 2). For this purpose, for ex., two sets with the same number of elastically deformable, pillow block type Coupling Elements 3, 3' can be provided on the periphery of a Ring Segment 5 in the attachment surface of Coupling Part 1 of the machine tool. In this case Coupling Elements 3' of the second set are offset by the same angle α in relation to Coupling Elements 3 of the first set.

The coupling represented on FIGS. 7 and 8 comprises a longer Coupling Part 11, attached to the machine tool, with undercuts below both longitudinal side edges, running parallel to the same and a Bearer 12. The precisely machined, inclined surface 11.1 of the left-hand side undercut in FIG. 7 is provided, together with the also precisely machined top surface of two bands 11.2 on the top of Coupling Part 11 of the machine tool for accurately guiding Bearer 12 with the help of the respective machined Guide Surfaces 12.1 and 12.2. For stopping Bearer 12, a bracket-type Projection 12.3, connected to the right-hand side undercut is attached to Coupling Part 11 with the help of a Screw 12.4 on the right-hand side of Handling Base 12. With this type of attachment, precise, reproducibly usable stops are provided for securing Handling Base 12 in both main, mutually perpendicular directions (Y, Z) of the plane of the drawing of FIG. 7. To create an equivalent stop also in main direction (X), according to the embodiment of the invention represented in FIG. 5, a Groove 13 with Hollow Spaces 13.1 running parallel to the groove on both sides, as well as a Bore 12.5, coaxial with Groove 13, in Bearer 12, is provided in Coupling Part 11 of the machine tool in the area over the left-hand undercut and a Bolt 14 is inserted in said cutouts 12.5, 13 (see FIG. 8). Because of the stop, already existing in the direction normal to the length of Coupling Part 11 of the machine tool in the direction of axis Y in FIG. 7, Bolt 14 does not contact the groove bottom. The construction of FIG. 5 provides an elastic resistance of the groove walls, which is more rigid than that of the slotted groove wall of FIGS. 1 through 4, so that a reliable stop is created in the spatial direction in question (X).

What is claimed is:

1. A device for reproducible highprecision determination of the relative position of a first object with respect to at least one second object, said device comprising:
   - a bearing member on which the first object is mounted; and
   - at least one set of first and second cooperating coupling elements, one of the first and second elements being secured to the bearing member, the other of the first and second elements being secured to the second object, said elements in the set being coupled together detachably to form a partially elastic coupling connection, either one of the first and second elements being rigid, the other one of the first and second elements being elastically deformable, said other one of the first and second elements which are elastically deformable being single pillow block parts with arbitrarily shaped individual base plates mounted along a circular arc, whereby one of said first and second coupling elements can be manufactured and positioned with high precision while greater tolerances are allowed for said other one of said first and second elements.

2. The device of claim 1, wherein the rigid elements are non-deformable.

3. The device of claim 1, wherein at least three sets of said cooperating coupling elements are provided.

4. The device of claim 1, wherein there are at least two groups of said block parts in said other one of the first and second elements.

5. The device of claim 4, wherein each of the two groups contains a like plurality of parts, each part in one group being disposed between two adjacent parts in the other group, each part of the group being offset from an adjacent part of the other group by the same constant angle.

6. The device of claim 5, wherein the groups in one group are disposed equidistantly along said circular arc and the parts in the other group are disposed equidistantly along another concentric arc.

7. The device of claim 1 wherein each pillow block part has an axial groove formed in an exposed surface thereof.

8. The device of claim 7, wherein the axial groove has the shape of a trapezoid.

9. The device of claim 1, wherein the coupling elements connected to the bearing member are profile parts and the coupling elements connected to the second object are said single pillow block parts which are elastically deformable, each block part having an axial groove in an exposed surface, said groove having exposed side walls, each profile part engaging a corresponding grove.

10. The device of claim 9, wherein each profile part is a rigid bolt which engages elastically both side walls of the corresponding groove.

11. The device of claim 10 wherein each groove has an exposed bottom portion and wherein each bolt engages the side walls and the bottom portion of the corresponding groove.

12. The device of claim 11, wherein each pillow block part has hollow portions therein.

13. The device of claim 12, wherein said hollow portions have openings flush with the side walls of the groove.

14. The device of claim 1, further including at least one ring segment which forms said circular arc.

15. The device of claim 7, wherein each pillow block part has a slot-like notch formed on each side of said groove.

16. The device of claim 15, wherein each notch extends from a side surface of said groove near a groove bottom obliquely upwards.

17. The device of claim 15, wherein each pillow block part is formed of two halves.

18. The device of claim 9, wherein each profile part is a rounded rib integrally formed with said bearing member.

19. The device of claim 9, wherein each profile part is a ball elastically engaging both side walls of the corresponding groove.

20. The device of claim 1, wherein stops are provided on said bearing member and counterstops are provided on said second object, said stops and counterstops defining a distance between said bearing member and said second object.

21. The device of claim 1, wherein said first object is a workpiece and said second object is a machine tool.

* * * * *